Jan. 15, 1952 — W. F. STREHLOW — 2,582,466
POWER TAKE-OFF

Filed Sept. 8, 1949 — 3 Sheets-Sheet 1

Inventor
Walter F. Strehlow
by James F. Coffee
Attorney

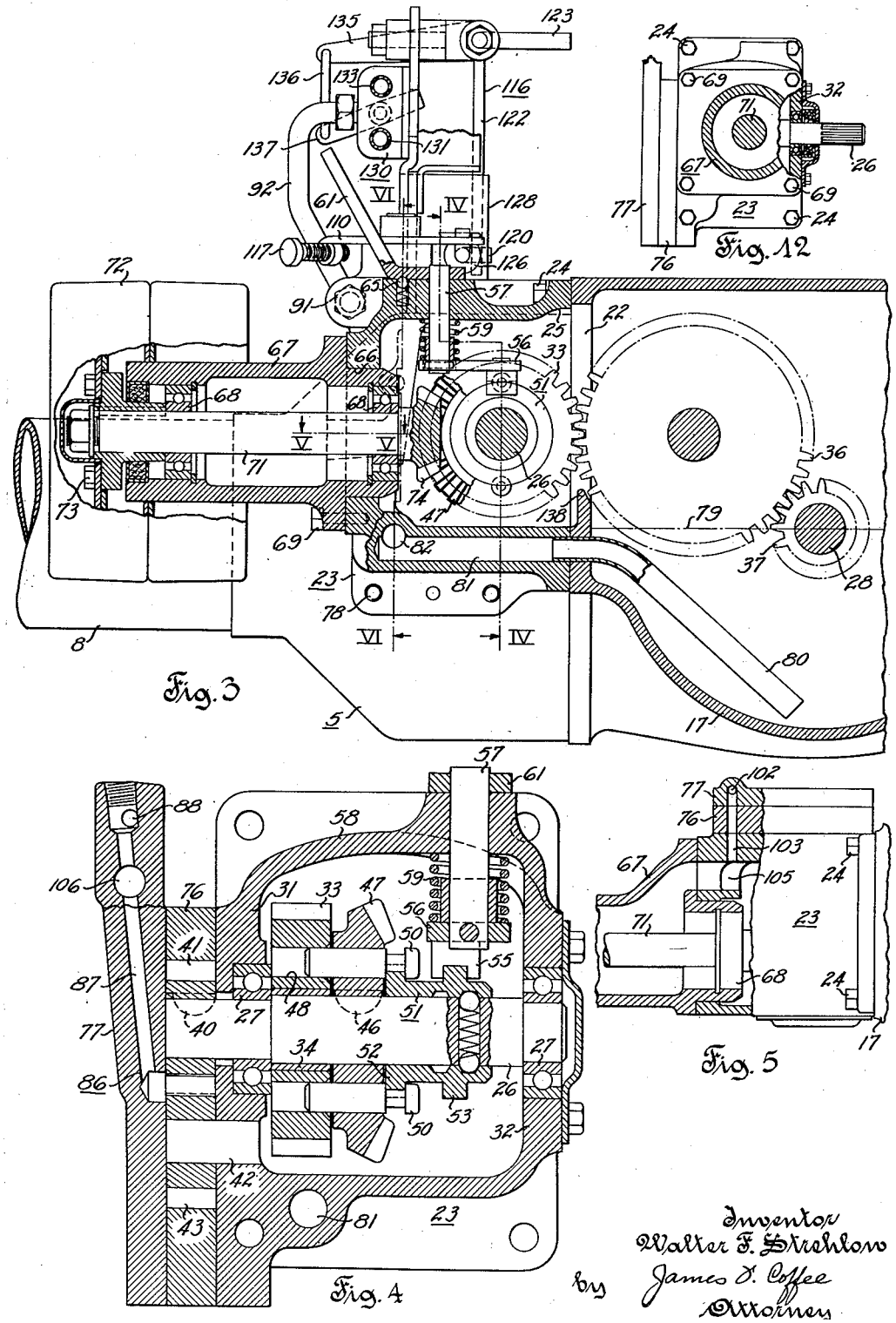

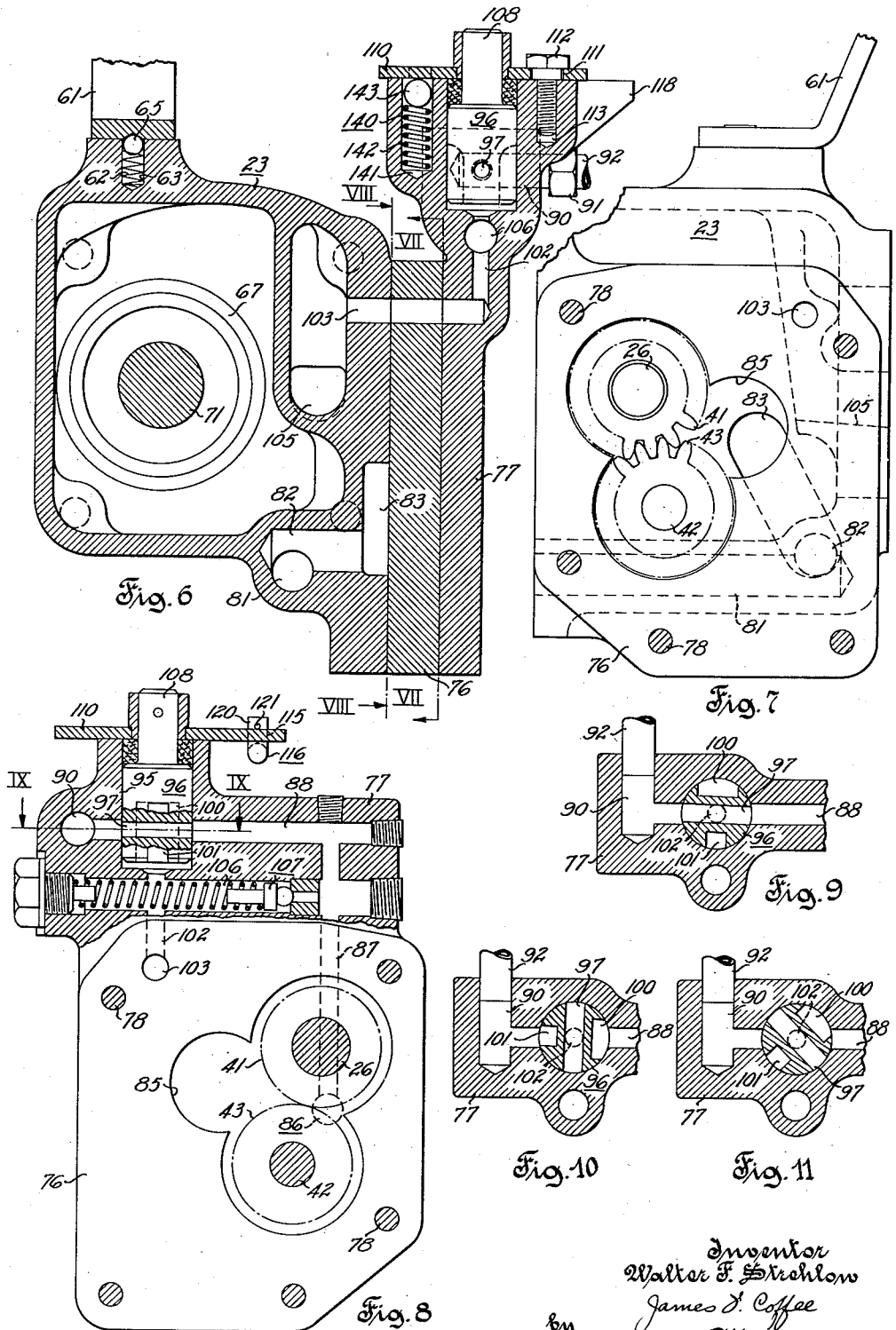

Patented Jan. 15, 1952

2,582,466

UNITED STATES PATENT OFFICE 2,582,466

POWER TAKE-OFF

Walter F. Strehlow, Wauwatosa, Wis., assignor to Allis-Chalmers Manufacturing Company, Milwaukee, Wis., a corporation of Delaware Application September 8, 1949, Serial No. 114,559

7 Claims. (Cl. 74—15.63)

This invention relates to self-propelled vehicles generally, and is more particularly directed to power take-off attachments for agricultural tractors.

With the advent of power driven agricultural implements it has long been found necessary to equip a farm tractor with some means, deriving power from the engine, affording an external source of power. This means is commonly referred to as a power take-off and may be in any of several forms including a belt pulley drive, a rotary shaft or a hydraulic lift mechanism. Often a tractor is provided with two or more such power take-offs and in such case it is not uncommon to combine two of the power take-offs into one unit receiving power from a single place on the tractor drive. Applicant's invention is concerned with the latter type arrangement and provides a plurality of external power sources affording rotary and reciprocating movement, respectively, of devices driven thereby.

Power take-off devices known heretofore which provide both rotary motion and hydraulic pumping action have been relatively large and not readily adaptable for use on the smaller type tractors where available space for such an attachment is at a premium. And it is, therefore, the primary object of the present invention to provide a unitary structure affording both rotary and hydraulic power which is small and compact with a minimum number of parts.

Another object of this invention is to provide a tractor power take-off unit comprising parts constructed and arranged in a novel and improved manner whereby both a rotary shaft and a hydraulic pump may be selectively driven from the tractor independently of any forward motion of the tractor.

Another object of this invention is to provide a tractor power take-off unit including a hydraulic pump and a rotary shaft, comprising a housing unit disposed and arranged in a novel and improved manner whereby a single source of lubricant serves both as a reservoir for said pump and as a source of lubricant for said rotary shaft and driving parts therefor.

The construction and operation of apparatus embodying the invention will become readily apparent as the disclosure progresses and particularly points out additional objects and advantages of special importance. And accordingly, the present invention may be considered as comprising the various constructions, combinations and/or subcombination of parts as is hereinafter more fully set forth in the detailed description and appended claims, reference being had to the accompanying drawings, in which:

Fig. 3 is an enlarged view taken along line III—III in Fig. 2;

Fig. 4 is an enlarged view taken along line IV—IV in Fig. 3;

Fig. 5 is a view taken along line V—V in Fig. 3;

Fig. 6 is an enlarged view taken along line VI—VI in Fig. 3;

Fig. 7 is a view taken along line VII—VII in Fig. 6;

Fig. 8 is a view taken along line VIII—VIII in Fig. 6;

Fig. 9 is a view taken along line IX—IX in Fig. 8 showing the control valve in its "lift" position;

Fig. 10 is a view similar to Fig. 9 with the control valve for the pump in its "lower" position;

Fig. 11 is another view similar to Fig. 9 and showing the pump control valve in its "hold" position; and Fig. 12 is a view similar to Fig. 4 showing a modified form of the present invention wherein the shaft journaled in the power take-off housing has been extended to provide an additional external source of power.

Figure 1:
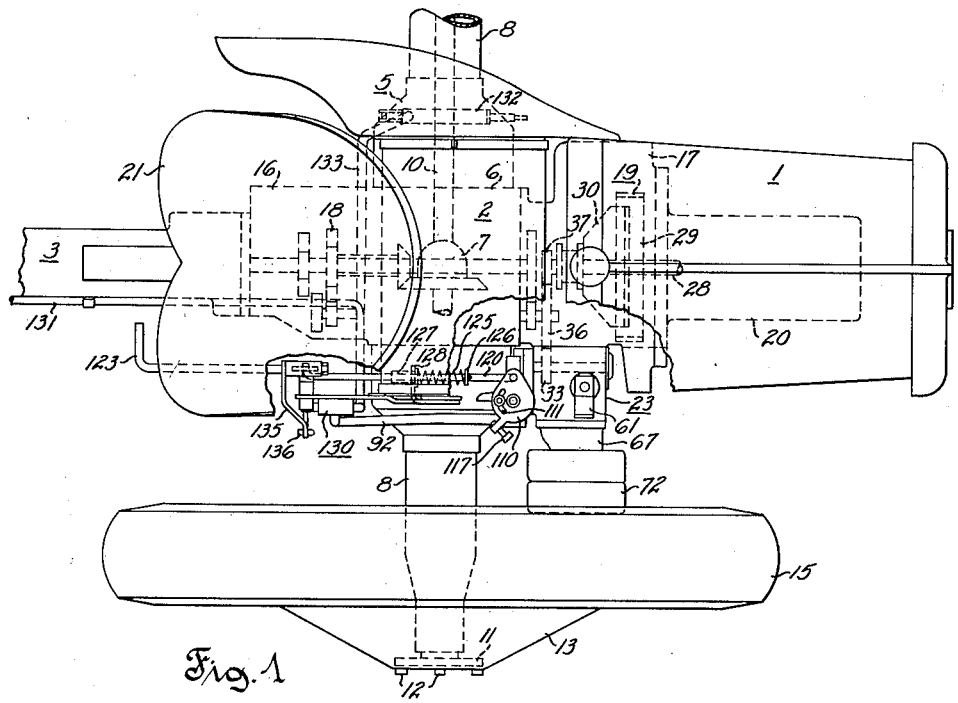
Fig. 1 is a partial plan view of a tractor embodying the present invention with parts omitted or broken away for sake of clarity.
Figure 2:
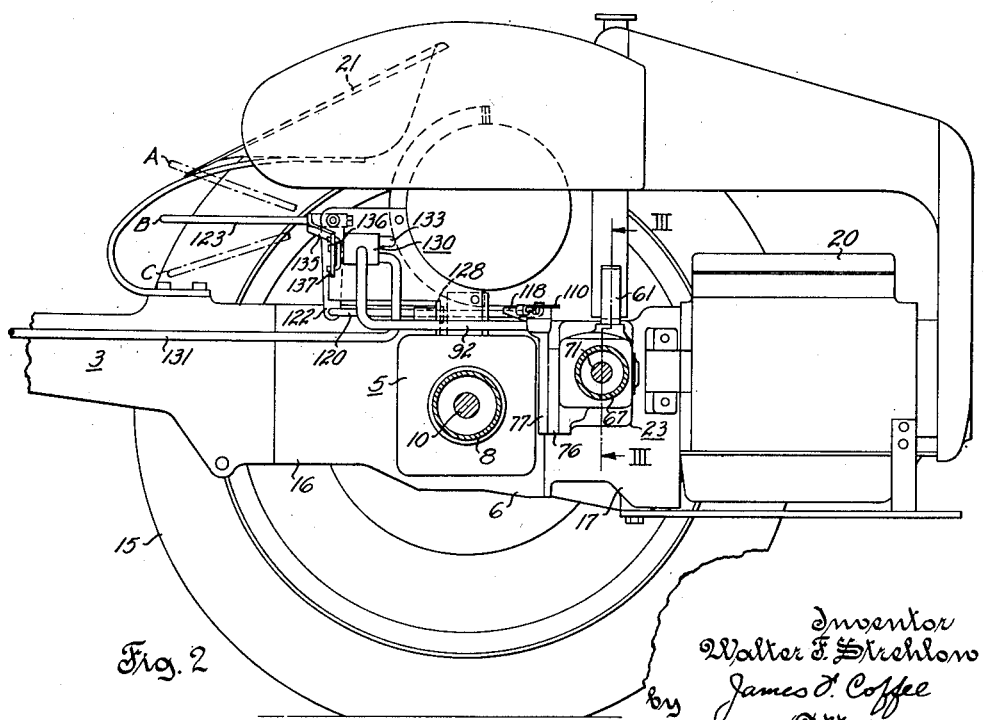
Fig. 2 is a side view of the structure shown in Fig. 1, with the rear driving wheel and belt pulley broken away.

Referring to Figs. 1 and 2, it will be seen that the apparatus chosen to illustrate the present invention comprises generally a tractor 1 having a rear driving unit 2 and a forwardly extending frame 3. The rear driving unit includes a transverse final drive housing 5 having an enlarged central portion 6 operatively enclosing a conventional differential drive mechanism 7 and having a pair of oppositely projecting axle shaft housings 8 each enclosing an axle shaft 10 having its inner end operatively connected with the differential mechanism. The outer or exposed end of each axle shaft terminates in a radially flanged hub portion 11 having fixed thereto, as by bolts 12, the central disk portion 13 of a driving wheel 15. The central portion 6 of the final drive housing includes an integral forwardly extending portion 16 enclosing a change speed gearing 18 operatively connected with differential mechanism 7 and with the driven element 30 of a conventional type clutch 19 enclosed in a clutch housing 17 detachably bolted or otherwise secured to the rear side of the final drive housing 5 in rearwardly overhanging relation thereto.

A conventional internal combustion engine 20 is detachably bolted to the rear end of housing 17 and is thereby supported in rearwardly overhanging relation to central portion 6 of final drive housing 5, and the adjacent end of the engine crankshaft 28 entering housing 17 has mounted thereon the driving element 29 of clutch 19. Suitable control means (not shown) are provided for the driving unit within easy reach of an operator seated at station 21 mounted on a rear portion of the forwardly extending frame portion 3. It is believed that the foregoing description of certain portions of the tractor is sufficient to properly explain the construction and operation of parts embodying the present invention.

Looking also at Fig. 3 it will be seen that clutch housing 17 has an opening 22 in one side wall thereof and a power take-off housing 23 is placed in covering relation thereto and secured in place as by bolts 24 (Fig. 12), with communication therebetween through opening 22 and a similar opening 25 in housing 23. The power take-off housing 23 (see also Fig. 4) has a shaft 26 rotatably mounted in bearings 27 carried by opposite end walls 31 and 32 of housing 23 with the shaft thereby positioned generally parallel to the longitudinal axis of the tractor. A gear 33 is carried by a portion of shaft 26 adjacent end wall 31 and is supported thereon, as by bearing 34, for rotation relative thereto. A portion of this gear extends through opening 25 in the side of the power take-off housing adjacent opening 22 and meshes with a reduction gear 36 rotatably mounted in clutch housing 17 in driven engagement with pinion 37 on engine drive shaft 28. Thus gear 33 is constantly driven with the engine drive shaft.

As best seen in Fig. 4 one end of shaft 26 extends through and beyond the forward facing wall 31 of housing 23 and this extending portion of the shaft has fixed thereto, as by key 40, a gear 41 comprising one pumping element of a hydraulic gear pump. A stub shaft 42 having a portion fixed in wall 31 is disposed in vertically spaced relation to shaft 26 and rotatably mounts thereon a second gear 43 disposed in constant meshing engagement with gear 41.

Within the main portion of the power take-off housing there is fixed to shaft 26, as by a key 46, a bevel gear 47 disposed in close relation to idler gear 33. Bevel gear 47 has a pair of circumferentially spaced transverse openings (not shown) through an intermediate portion thereof which are alignable with any of several similar pairs of openings 48 in idler gear 33 and a pair of shiftable keys 50 are positioned in the openings through gear 47 for selective axial movement into and out of engagement with a corresponding pair of the openings 48 in idler gear 33. With keys 50 engaging idler gear 33 the two gears are locked against relative rotation and, consequently, any power applied to idler gear 33 will be transmitted to bevel gear 47 and shaft 26.

For manually effecting an axial shifting of keys 50 there is provided a shift collar 51 slidably mounted on shaft 26 in concentric relation thereto and including as part thereof a shoulder portion 52 engaging and coacting with keys 50 to provide for movement of these parts as a unit. A circular flange portion 53 of collar 51 engages a shifting fork 55 fixedly supported in depending relation to one end of a generally horizontal arm 56 which is supported at its other end by a vertically disposed rod or the like 57 rotatably mounted in the upper wall 58 of housing 23 and extending therethrough. A compression spring 59 on rod 57 between arm 56 and the under surface of wall 58 provides a biasing means for maintaining an engaging relation between shifter fork 55 and the shift collar portion 53. The portion of rod 57 extending above wall 58 of housing 23 has a hand lever 61 nonrotatably fixed thereto and upon movement of this lever a turning movement of rod 57 is effected to swing arm 56 and thereby move shift fork 55, shift collar 52 and keys 50 in a direction generally parallel to shaft 26. A position indicating detent mechanism is provided for shift lever 61 (Fig. 6) comprising a compression spring 62 seated in a generally vertical bore 63 in the upper wall of the main housing 23 and a ball 65 seated thereon for engagement with a complementary recessed portion on the under surface of hand lever 61. Thus the operator can readily ascertain when he has moved the lever 61 sufficient to shift keys 50 into openings 48 in idler gear 33 by feeling ball 65 move into the recess or grooved portion of the lever.

It will be noted also (see Fig. 3) that the main portion 23 of the power take-off housing has another opening 66 in the side wall thereof directly opposite opening 25 communicating with the clutch housing. A laterally projecting pulley shaft housing portion 67 is disposed in enclosing relation to this opening and detachably fixed to main housing 23 as by bolts 69. Bearings 68 at opposite ends of housing 67 rotatably support a pulley shaft 71 having a belt pulley 72 detachably fixed at the outer end thereof as by bolts 73 and having a bevel gear 74 fixed on its inner end for meshing engagement with bevel gear 47 on shaft 26. Thus it is seen that pulley 72 and pump gears 41 and 43 are driven simultaneously by the tractor engine upon engagement of shiftable elements 50 with idler gear 33.

And referring now to Figs. 4 and 6 to 11, inclusive, it is seen that the hydraulic pump portion of the apparatus disclosed comprises generally a relatively flat pump body 76 disposed in covering relation to the forwardly facing end wall 31 of the power take-off main housing portion 23 in enclosing relation to gears 41 and 43, and a pump control housing 77 serving as an end plate for the pump body and mounting a pump control means on the upper portion thereof. Suitable means, such as bolts 78 (Fig. 3), secure pump body 76 and control housing 77 in detachably fixed relation to main housing 23.

Affording communication between the source of oil in clutch housing 17, normally at a level indicated by the numeral 79, and pump body 76 is a series of passages including a tubular part 80 (Fig. 3) extending into clutch housing 17 and joined at one end to a passage 81 in main housing portion 23, a passage 82 disposed at a right angle with respect to the end of passage 81 remote from the clutch housing and an intake chamber or passage 83 (Figs. 6 and 7) placing passage 82 in communication with pump body 76.

Pump body 76 has a relatively large opening therethrough forming a chamber 85 (Figs. 7 and 8) for pump gears 41 and 43 and communicating with intake chamber 83 and a discharge passage means 86. Pump control housing 77 includes the pump discharge passage means 86 which comprises a generally vertical passage 87 extending upward from a point adjacent the meshing teeth of the pump gears to a horizontal passage 88 in an enlarged portion of the pump control housing.

The outer end of horizontal passage 88, that is, the end remote from vertical passage 87, communicates with an outlet passage 90 transversely disposed with respect thereto and provided at either end with a coupling device 91 (Fig. 3) affording connection with a ram hose 92 or the like.

A vertical cylindrical chamber 95 is formed in control housing 77 at a point intersecting horizontal passage 88 intermediate the ends thereof and this chamber houses a rotary plug valve 96 controlling the flow of fluid through the passage. More specifically, this generally cylindrical valve 96 is positioned in chamber 95 for rotation about its axis and has a transverse bore 97 therethrough alignable with horizontal passage 88 to permit the flow of fluid from the discharge passage to the outlet passage. Control valve 96 also includes oppositely facing vertically grooved portions 100 and 101 (Figs. 9 to 11) disposed generally at right angles with respect to transverse bore 97 and having their lower end portions disposed in the bottom portion of the control valve chamber. These oppositely facing grooves are selectively alignable with adjacent portions of horizontal passage 88 to place the discharge passage and the outlet passage, respectively, in communication with the lower portion of valve chamber 95. The lower portion of control chamber 95 has communication with a generally vertical return passage 102 which in turn communicates with a horizontal return passage 103 through pump body 76 emptying into a channel 105 formed in the adjacent end portion of pulley shaft housing 67 (Figs. 5 and 6). Channel 105 in turn empties at one end into pulley shaft housing 67 and at the other end into main housing portion 23 of the power take-off.

Referring to Fig. 8 it is seen that control housing 77 also includes a second horizontal passage 106 affording a pressure relief passage means for the pump and communicating at opposite end portions with discharge passage 87 and return passage 102. Relief passage 106 includes therein a spring biased ball check valve assembly 107 controlling flow through the opening at the high pressure side and responsive to attainment of a predetermined pressure in discharge passage 87 to place same in direct communication with return passage means 102.

Control valve 96 includes a reduced upper end portion 108 extending through the top surface of control housing 77 and having a transversely disposed plate-like part 110 fixedly mounted thereon in slidably engaging relation to the top surface of the housing. Plate 110 has an arcuate slot 111 (Figs. 1 and 6) adjacent one edge thereof and a cap screw 112 threaded into a bore 113 in the upper portion of control housing 77 is positioned through this slot. Plate 110 is essentially a lever pivotable about the axis of the control valve in unison therewith and has an opening 115 through an end thereof remote from valve 96 affording suitable connection with one end of a hand control lever assembly 116. Slot 111 and cap screw 112 coact to limit the range of movement of the control valve from "lift" position, wherein bore 97 is positioned to place discharge passage 88 in communication with outlet passage 90 (Figs. 8 and 9), to a "lower" position (Fig. 11) placing the vertical grooves 100 and 101 in position to effect a discharge to return passage 102 and a return of fluid from outlet passage 90 to the return passage. There is also provided a means for adjustably limiting the movement of control valve 96 in its "lower" position comprising a knurled adjusting screw 117 (Figs. 1 and 3) threadedly positioned in an ear like projection of plate 110 and a lug portion 118 formed on the forward side of control housing 77. By moving screw 117 relative to plate 110 the travel of valve 96 in its lowering position may be limited. In other words through use of this adjusting means the valve may be selectively stopped in its path of rotation at a selected point making its full lower position lie somewhere between that shown in Fig. 11 and the "hold" position in Fig. 10.

The operator's hand lever assembly 116 comprises generally a rod 120 having the rear end portion bent to pass through opening 115 in plate 110 (Fig. 8) and pivotally secured therein by suitable means such as pin 121 and having the forward end portion pivotally attached to the lower end of a crank arm 122 (Figs. 1 and 2) which is pivotally mounted on the tractor, and a forwardly extending hand lever 123 having connection with arm 122 for effecting rotation of same relative to the tractor. A spring biasing means is provided in order to effect a return of the hand lever to a neutral or "hold" position (wherein the lever is positioned as seen in Figs. 1 and 2 and the control valve is thereby moved to the position shown in Fig. 11) when released from its raised or "lift" position (shown as "A" in broken lines in Fig. 2). This biasing means comprises a compression spring 125 (Figs. 1 and 2) surrounding rod 120 and fixed against movement in one direction by any suitable means such as washer and pin assembly 126, a sleeve like part 127 positioned at the opposite end of spring 125 and having a collar providing a seat for the spring, and a bracket 128 mounted on the tractor restraining sleeve 127 from forward sliding movement along rod 120. Thus when lever 123 is moved upward to position A, wherein valve 96 is placed in its "lift" position with discharge to the outlet 90, spring 125 is compressed between washer 126 and sleeve 127 and release of the lever will cause the spring to expand to its full length and return lever 123 to its neutral ("hold" position for valve 96) position "B". Downward movement of lever 123 to position C ("lower" position for the valve) is not affected by the spring and, consequently, the lever will remain at any selected position between B and C until manually repositioned.

It will be further noted in Figs. 1 and 2 that the pump control apparatus includes a two way valve 130 positioned on the tractor to receive fluid through a single hose 92 connected to the pump outlet and affording selective communication with either a front mounted ram (not shown) through hose 131 or a rear mounted ram 132 through hose 133. This two way valve is also controlled by hand lever 123 which is connected therewith through a linkage including an arm 135 fixed to lever 123 and a link 136 connecting the free end portion of arm 135 with a smaller arm 137 fixed to the valve. Rotation of lever 123 about its longitudinal axis effects a rotary movement of the flow control part (not shown) of valve 130 to selectively afford communication between the pump and either of the hydraulic rams. A further description of this portion of the apparatus is believed unnecessary for a complete understanding of the present invention.

Having in mind the construction and arrangement of parts in the hydraulic system just described, the details of the operation of this system will now be described. Looking particularly at Fig. 4 it is seen that when shift elements 50 are moved into engagement with idler gear 33, bevel gear 47, shaft 26 and pump gear 41 are driven in unison by the tractor engine. The rotation of pumping gears 41 and 43 within the confines of the pump body 76 create a suction sufficient to draw oil from clutch housing 17 through passages 81 and 82 into intake chamber 83 where it is caught between the meshing teeth of the gears and discharged under pressure into passage 87. From this discharge passage the oil is directed by control valve 96 either into outlet passage 90, from whence it travels through the two way valve to one of the rams, or down through valve chamber 95 to return passage 102 from where it flows through channel 105 into the pulley shaft housing 67 and the main housing portion 23. And when the oil level in main housing 23 gets above the side wall portion 138 (Fig. 3) the oil flows into clutch housing 17.

In the event the pressure in discharge passage means 86 exceeds a predetermined amount at any time the ball check valve 107 (Fig. 8) is forced off its seat and the pump discharges through relief passage 106 to return passage 102 until the cause for the excessive pressure is eliminated and discharge at operating pressure is resumed.

As shown in Figs. 9, 10 and 11 the operation of hand lever 123 rotates control valve 96 through approximately 90 degrees and with the lever in position A (Fig. 2) the valve will be positioned as shown in Fig. 9 with discharge passage 88 in communication with outlet passage 90. When the lever is moved to position B the valve assumes the position shown in Fig. 10 with the ram outlet passage blocked off, thereby trapping any fluid in the rams, and vertical slot 100 is positioned to afford flow from the discharge passage to return passage 102. With the lever in position C the control valve is positioned to afford communication between discharge passage 88 and return passage 102 through slot 100 and also to permit the return of fluid from the rams through outlet passage 90 and slot 101 to return passage 102 (Fig. 11).

And in connection with control lever 123 and control valve 96 it will be noted (Fig. 6) that a "hold" position indicating means has been provided in the form of a ball and detent device 140. More specifically, a bore 141 in the upper portion of control valve housing 77 has seated therein a spring 142 and ball 143 which coact with an opening in plate 110 to indicate to the operator when lever 123 has been moved to a position placing valve 96 in the position shown in Fig. 10.

A modified form of this invention is shown in Fig. 12 wherein shaft 26 has been extended through rear end wall 32 of the power take-off housing and the projecting end portion has been splined to receive a coupling element thereon (not shown) for transmitting rotary power to an implement or the like. Thus it will be seen that with such an arrangement there is provided an integral power take-off unit affording three different sources of power selectively driven in unison by the tractor engine.

And although shown and described as applied to particular forms of power take-off, it should be understood that it is not thereby intended to limit the invention to the exact construction and combinations shown and described as certain features thereof are of more general application and as various modifications within the scope of the appended claims may occur to persons skilled in the art.

It is claimed and desired to secure by Letters Patent:

1. In a power take-off mechanism, a first housing having a shaft journaled therein with one end of said shaft extending through and beyond one wall of said housing, a first gear in said housing fixed to said shaft for rotation therewith, an idler gear rotatably mounted on said shaft in adjacent relation to said first gear and adapted for meshing engagement with an external drive gear, means for selectively connecting said first and idler gears for rotation in unison, a power take-off shaft rotatably supported by said first housing and extending outwardly therefrom, a second gear fixed on an inner end portion of said power take-off shaft for rotation therewith in meshing relation with said first gear, a housing portion disposed in covering relation to said one wall of said first housing and enclosing said one end of said first mentioned shaft, a hydraulic pumping element carried by said housing portion adjacent an interior wall thereof, and a third gear mounted on said one end of said first mentioned shaft for rotation therewith and having a driving engagement with said pumping element.

2. In a power take-off mechanism, a first housing having a shaft journaled in opposite end walls thereof with one end of said shaft extending through and beyond one of said end walls, an element in said housing fixed to said shaft for rotation therewith, an idler gear rotatably mounted on said shaft in adjacent relation to said element and adapted for meshing engagement with an external drive gear, means for locking said element and idler gear against relative rotation, a hydraulic pump comprising a housing portion enclosing a pumping element and disposed in covering relation to said one end wall of said first housing in covering relation to said one end of said shaft, a pump gear mounted on said one end portion of said shaft for rotation therewith and having a driving connection with said pumping element, and external power take-off means deriving power from said shaft when said element and said idler gear are locked against relative rotation.

3. In a power take-off mechanism, a first housing having a shaft journaled in opposite end walls thereof with one end of said shaft extending through and beyond its supporting wall, a first gear in said housing fixed to said shaft for rotation therewith, an idler gear rotatably mounted on said shaft in adjacent relation to said first gear and adapted for meshing engagement with a drive gear external of said first housing, a power take-off shaft rotatably supported by said first housing and extending outwardly therefrom, a second gear mounted on the inner end portion of said power take-off shaft for rotation therewith in meshing relation with said first gear, a hydraulic pump comprising a housing portion enclosing a pumping element and disposed in covering relation to said one end wall of said first housing in enclosing relation to said one end of said shaft, a pump gear mounted on said one end portion of said shaft for rotation therewith and having a driving connection with said pumping element, and shiftable means carried by said first gear and selectively positionable through an alignable opening in said adjacent idler gear whereby said pump gear and said power take-off shaft may be simultaneously driven.

4. In a power take-off mechanism, a first housing having a shaft journaled therein with one end of said shaft extending through and beyond one wall of said housing, an element in said housing fixed to said shaft for rotation therewith, an idler gear rotatably mounted on said shaft in adjacent relation to said element and adapted for meshing engagement with an external drive gear, means for selectively connecting said element and idler gear for rotation in unison, a hydraulic pump comprising a housing portion enclosing a pumping element and disposed in covering relation to said one end wall of said first housing in covering relation to said one end of said shaft, pump drive means mounted on said one end portion of said shaft for rotation therewith and being operatively associated with said pumping element, and external power take-off means deriving power from said shaft when said element and idler gear are connected for rotation in unison.

5. In a power take-off mechanism, a first housing having a shaft journaled in opposite end walls thereof with the ends of said shaft extending through said walls and projecting outwardly from said housing, an element in said housing fixed to said shaft for rotation therewith, an idler gear rotatably mounted on said shaft in adjacent relation to said element and adapted for meshing engagement with an external drive gear, means for selectively locking said element and idler gear against relative rotation, a hydraulic pump comprising a housing portion enclosing a pumping element and disposed in covering relation to one of said end walls of said first housing in enclosing relation to one end of said shaft, a pump drive means mounted on said one end portion of said shaft within said pump housing and operatively associated with said pumping element, and additional means on the other end portion of said shaft comprising an external power take-off driving power from said shaft.

6. In a power take-off mechanism, a first housing having a shaft journaled in opposite end walls thereof with the ends of said shaft extending through said walls and projecting outwardly from said housing, a first gear in said housing fixed to said shaft for rotation therewith, an idler gear rotatably mounted on said shaft in adjacent relation to said first gear and adapted for meshing engagement with an external drive gear, means for selectively connecting said first and idler gears for rotation in unison, a power take-off shaft rotatably supported within said first housing and extending outwardly therefrom, a second gear fixedly mounted on the inner end portion of said power take-off shaft in meshing relation with said first gear, a hydraulic pump comprising a housing portion enclosing a pumping element and disposed in covering relation to one end wall of said first housing in enclosing relation to one end of said shaft, a pump drive means mounted on said one end portion of said shaft for rotation therewith and operatively associated with said pumping element, and additional means on the other end of said shaft comprising an additional external power take-off deriving power from said shaft.

7. In a power take-off mechanism, a first housing having a shaft journaled in opposite end walls thereof with one end of said shaft extending through and beyond one wall of said housing, said first housing also having an opening in one side wall thereof and being adapted for detachable connection to a lubricant confining housing having a drive gear mounted therein and having an opening communicating directly with said opening in the side wall of said first housing, an element in said first housing fixed to said shaft for rotation therewith, an idler gear rotatably mounted on said shaft in adjacent relation to said element and adapted for meshing engagement with said drive gear, means for selectively connecting said element and idler gear for rotation in unison, a hydraulic pump comprising a housing portion enclosing a pumping element and disposed in covering relation to said one end wall of said first housing and said one end of said shaft, a pump drive means mounted on said one end portion of said shaft for rotation therewith and being operatively associated with said pumping element, external power take-off means deriving power from said shaft when said first mentioned element and idler gear are connected for rotation in unison, means defining a first passage extending from said first housing and adapted for communication with the interior of said lubricant confining housing, and additional passage means in said first and pump housings affording communication therebetween and placing said first passage in communication with said pumping element.

WALTER F. STREHLOW.

REFERENCES CITED

The following references are of record in the file of this patent:

UNITED STATES PATENTS

| Number | Name | Date |
| --- | --- | --- |
| 1,436,442 | Hodge | Nov. 21, 1922 |
| 2,448,822 | Pinardi et al. | Sept. 7, 1948 |
| 2,475,242 | Iavelli | July 5, 1949 |
| 2,495,988 | Sheppard | Jan. 31, 1950 |